United States Patent [19]

Kamiya et al.

[11] Patent Number: 5,741,830
[45] Date of Patent: Apr. 21, 1998

[54] WATER-ABSORPTIVE SOFT CONTACT LENS

[75] Inventors: Miyuki Kamiya; Naotaka Kamiya; Noriko Iwata, all of Kasugai; Yasushi Yamamoto; Yasuo Tarumi, both of Gunma-ken, all of Japan

[73] Assignee: Menicon Co., Ltd., Nagoya, Japan

[21] Appl. No.: 600,877

[22] Filed: Feb. 13, 1996

[30] Foreign Application Priority Data

Feb. 15, 1995 [JP] Japan ................ 7-026981

[51] Int. Cl.$^6$ .......................... G02C 7/04
[52] U.S. Cl. ............. 523/106; 351/160 H; 523/108; 524/578; 524/545; 526/247
[58] Field of Search ............. 523/106, 108; 524/578, 545; 526/247; 351/160 H

[56] References Cited

U.S. PATENT DOCUMENTS

| | | | |
|---|---|---|---|
| 4,640,965 | 2/1987 | Falcetta et al. | 526/242 |
| 5,091,588 | 2/1992 | Yamamoto | 568/607 |
| 5,264,465 | 11/1993 | Futamura et al. | 523/106 |
| 5,424,468 | 6/1995 | Kim et al. | 554/226 |

FOREIGN PATENT DOCUMENTS

| | | | |
|---|---|---|---|
| 3294818 | 12/1991 | Japan | 523/106 |
| 4-161405 | 6/1992 | Japan . | |

| | | | |
|---|---|---|---|
| 2018548 | 10/1992 | WIPO | 523/106 |

OTHER PUBLICATIONS

Patent Abstracts of Japan, vol.014, No.475, Oct. 17, 1990; JP 01 –016,621.
Patent Abstracts of Japan, vol.013, No.391, Aug. 30, 1989; JP 62–299,070.
Chemical Abstracts, vol. 107:200569g, Nov. 30, 1987; "Fluoroalkyl–substituted Styrene Polymers", p. 117.

*Primary Examiner*—Andrew E.C. Merriam
*Attorney, Agent, or Firm*—Armstrong, Westerman, Hattori, McLeland & Naughton

[57] ABSTRACT

A water-absorptive soft contact lens comprising a polymer prepared by polymerizing a monomer mixture comprising (A) a fluorine-containing styrene derivative represented by the general formula (I):

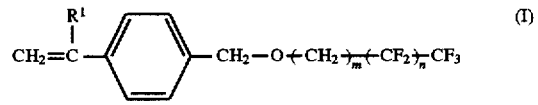

wherein $R^1$ is hydrogen atom or methyl group, m is an integer of 1 to 3 and n is 0 or an integer of 1 to 7, and (B) N, N-dimethyl(meth)acrylamide. The water-absorptive soft contact lens has excellent oxygen permeability, high mechanical strength and excellent flexibility independent of water content.

5 Claims, No Drawings

WATER-ABSORPTIVE SOFT CONTACT LENS

BACKGROUND OF THE INVENTION

The present invention relates to a water-absorptive soft contact lens, and more particularly to a water-absorptive soft contact lens which has excellent oxygen permeability, high mechanical strength and excellent flexibility independent of water content.

Conventionally, in contact lens materials, there are hard materials and soft materials. In order to obtain a contact lens which is excellent in sensation of wearing, in general, soft materials are suitably used. In the soft materials, there are water-absorptive materials which swell and soften when absorbing water and substantially non-water-absorptive materials.

In order to be able to wear a contact lens in an eye more safely for a long period of time, it is necessary that more oxygen is supplied for a cornea. Therefore, there is employed a method for substantially heightening oxygen permeability comprising heightening oxygen permeability of materials or reducing the thickness of a lens.

The above water-absorptive material itself does not permeate oxygen, and the oxygen permeability is imparted to the material through the water absorbed in the material. For instance, as is clear from the description of "OXYGEN PERMEABILITY OF CONTACT LENS MATERIALS: A 1993 UPDATE" by Fatt and Ruben, which is described in "Journal of the British Contact Lens Association", 17 [1] (1994), pages 11 to 18 (hereinafter referred to as "Journal of Fatt et al"), in general, it is known that oxygen permeability depends on water content. Accordingly, in order to heighten the oxygen permeability of a contact lens, a material having a high water content is necessitated. However, in general, there arises a disadvantage such that the mechanical strength of the material becomes lower in accordance with the increase of water content of the material.

When a low water-absorptive material is used, there has been attempted the diminishing of the thickness of a lens made of the material to substantially heighten its oxygen permeability. However, the production of a thin lens which can supply sufficient oxygen for a cornea is technically difficult.

The present invention has been accomplished in consideration of the above prior art.

An object of the present invention is to provide a water-absorptive soft contact lens which has excellent oxygen permeability, high mechanical strength and excellent flexibility independent of water content.

This and other objects of the present invention will become apparent from the description hereinafter.

SUMMARY OF THE INVENTION

In accordance with the present invention, there is provided a water-absorptive soft contact lens comprising a polymer prepared by polymerizing a monomer mixture comprising (A) a fluorine-containing styrene derivative represented by the general formula (I):

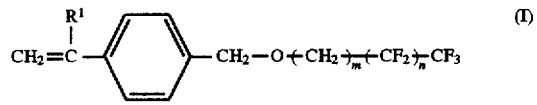

wherein $R^1$ is hydrogen atom or methyl group, m is an integer of 1 to 3 and n is 0 or an integer of 1 to 7, and (B) N,N-dimethyl(meth)acrylamide.

DETAILED DESCRIPTION

The water-absorptive soft contact lens of the present invention comprises, as mentioned above, a polymer prepared by polymerizing a monomer mixture comprising (A) a fluorine-containing styrene derivative represented by the general formula (I):

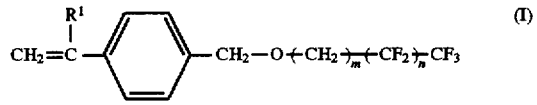

wherein $R^1$ is hydrogen atom or methyl group, m is an integer of 1 to 3 and n is 0 or an integer of 1 to 7 (hereinafter referred to as "fluorine-containing styrene derivative (A)", and (B) N,N-dimethyl(meth) acrylamide (hereinafter referred to as "N,N-dimethyl(meth)acrylamide (B)").

The fluorine-containing styrene derivative (A) used in the present invention is a component which imparts excellent oxygen permeability independent of water content to an obtained water-absorptive soft contact lens and improves mechanical strength of the water-absorptive soft contact lens.

The above fluorine-containing styrene derivative (A) is a compound represented by the general formula (I). In the general formula (I), n is 0 or an integer of 1 to 7. It is not desired that n is more than 7 because it is difficult to purify the fluorine-containing styrene derivative (A) and moreover a fluorine-containing alkylene chain becomes too long, thereby mechanical strength of an obtained water-absorptive soft contact lens is lowered. It is desired that n is an integer of 1 to 5.

As typical examples of the fluorine-containing styrene derivative (A), there can be cited, for instance, 4-vinylbenzyl 2',2',2'-trifluoroethyl ether, 4-vinylbenzyl 3',3',3'-trifluoropropyl ether, 4-vinylbenzyl 4',4',4'-trifluorobutyl ether, 4-vinylbenzyl 2',2',3',3',3'-pentafluoropropyl ether, 4-vinylbenzyl 2',2',3',3',4',4',4'-heptafluorobutyl ether, 4-vinylbenzyl 3',3',4',4',5',5',5',6',6'-nonafluorohexyl ether, 4-vinylbenzyl 3',3',4',4',5',5',6',6',7',7',8',8',9',9',10',10',10'-heptadecafluorodecyl ether and the like. These can be used alone or in an admixture thereof. Among them, 4-vinylbenzyl 3',3',4',4',5',5',6',6'-nonafluorohexyl ether is preferable from the viewpoint that effects for improving oxygen permeability and mechanical strength of an obtained water-absorptive soft contact lens are large.

The N,N-dimethyl(meth)acrylamide (B) used in the present invention is a component which imparts suitable water content for a water-absorptive contact lens and flexibility to an obtained water-absorptive soft contact lens when water is absorbed therein.

The term ". . . (meth)acry" prescribed in the present specification is intended to mean ". . . acry" and/or ". . . methacry".

It is desired that the weight ratio of the fluorine-containing styrene derivative (A) to the N,N-dimethyl(meth)acrylamide (B) (fluorine-containing styrene derivative (A)/N,N- dimethyl(meth)acrylamide (B)) is adjusted to at least 10/90, preferably at least 15/85 in order to sufficiently exhibit effects for improving oxygen permeability and mechanical strength based on the fluorine-containing styrene derivative (A). Also, it is desired that the above weight ratio is adjusted to at most 80/20, preferably at most 75/25 in order to avoid that the amount of the N, N-dimethyl(meth) acrylamide (B) becomes relatively small, thereby water content and flexibility of an obtained water-absorptive soft contact lens are lowered.

The monomer mixture used in the present invention contains the fluorine-containing styrene derivative (A) and the N, N-dimethyl(meth)acrylamide (B). In the present invention, in addition to them, in compliance with the properties of an objected water-absorptive soft contact lens, a polymerizable monomer capable of copolymerizing with the fluorine-containing styrene derivative (A) and the N,N-dimethyl(meth) acrylamide (B) (hereinafter referred to as "polymerizable monomer (C)") can be properly contained in the monomer mixture.

For instance, in order to impart hydrophilic properties to an obtained water-absorptive soft contact lens and increase water content of an obtained water-absorptive soft contact lens, a hydrophilic monomer can be used as a polymerizable monomer (C).

As typical examples of the above hydrophilic monomer, there can be cited, for instance, hydroxyl group-containing (meth)acrylates such as hydroxyethyl (meth)acrylate, hydroxypropyl (meth)acrylate, hydroxybutyl (meth) acrylate, dihydroxypropyl (meth)acrylate, dihydroxybutyl (meth)acrylate, diethyleneglycol mono(meth)acrylate, triethyleneglycol mono(meth)acrylate, propyleneglycol mono (meth)acrylate and dipropyleneglycol mono(meth)acrylate; (meth)acrylic acid; aminoalkyl (meth)acrylates such as aminoethyl (meth)acrylate, N-metylaminoethyl (meth)acrylates, N-N-dimethylaminoethyl (meth)acrylate and 2-butylaminoethyl (meth)acrylate; alkoxy group-containing (meth) acrylates such as methoxyethyl (meth)acrylate, ethoxyethyl (meth)acrylate and methoxydiethyleneglycol (meth)acrylate; maleic anhydride; maleic acid; maleic acid derivatives; fumaric acid; fumaric acid derivatives; aminostyrene; hydroxystyrene; and the like. These can be used alone or in an admixture thereof.

For instance, in order to more improve oxygen permeability and mechanical strength of an obtained water-absorptive soft contact lens, a silicon-containing monomer can be used as a polymerizable monomer (C).

As the above silicon-containing monomer, there can be cited, for instance, a silicon-containing (meth)acrylate, a silicon-containing styrene derivative, a silicon-containing fumarate and the like.

As typical examples of the above silicon-containing (meth)acrylate, there can be cited, for instance, trimethylsiloxydimethylsilylmethyl (meth)acrylate, trimethylsiloxydimethylsilylpropyl (meth)acrylate, methylbis (trimethylsiloxy)silylpropyl (meth)acrylate, tris (trimethylsiloxy)silylpropyl (meth)acrylate, mono (methylbis(trimethylsiloxy)siloxy)bis(trimethylsiloxy) silylpropyl (meth)acrylate, tris(methylbis(trimethylsiloxy) siloxy)silylpropyl (meth)acrylate, methylbis (trimethylsiloxy)silylpropylglyceryl (meth)acrylate, tris (trimethylsiloxy)silylpropylglyceryl (meth)acrylate, mono (methylbis(trimethylsiloxy)siloxy)bis(trimethylsiloxy) silylpropylglyceryl (meth)acrylate, trimethylsilylethyltetramethyldisiloxypropylglyceryl (meth) acrylate, trimethylsilylmethyl (meth)acrylate, trimethylsilylpropyl (meth)acrylate, trimethylsilylpropylglyceryl (meth) acrylate, trimethylsiloxydimethylsilylpropylglyceryl (meth) acrylate, methylbis (trimethylsiloxy)silylethyltetramethyldisiloxymethyl (meth)acrylate, tetramethyltriisopropylcyclotetrasiloxanylpropyl (meth) acrylate, tetramethyltripropylcyclotetrasiloxybis (trimethylsiloxy)-silylpropyl (meth)acrylate and the like.

As typical examples of the above silicon-containing styrene derivative, there can be cited, for instance, a silicon-containing styrene derivative represented by the general formula (II):

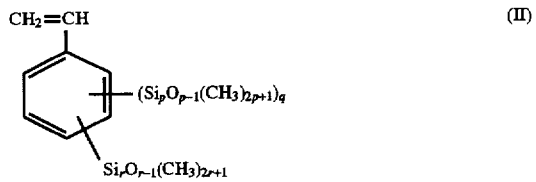

wherein p is an integer of 1 to 15, q is 0 or 1, and r is an integer of 1 to 15, and the like. When p or r in the above general formula (II) is an integer of at least 16, there are tendencies that purification and synthesis of the silicon-containing styrene derivative represented by the general formula (II) become difficult and that hardness of an obtained water-absorptive soft contact lens is lowered. Also, when q in the above general formula (II) is an integer of at least 2, there is a tendency that synthesis of the silicon-containing styrene derivative becomes difficult.

As typical examples of the above silicon-containing styrene derivative represented by the general formula (II), there can be cited, for instance, tris(trimethylsiloxy)silylstyrene, bis(trimethylsiloxy)methylsilylstyrene, (trimethylsiloxy) dimethylsilylstyrene, tris(trimethylsiloxy) siloxydimethylsilylstyrene, (bis(trimethylsiloxy) methylsiloxy)dimethylsilylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris (pentamethyldisiloxy)silylstyrene, tris(trimethylsiloxy) siloxybis(trimethylsiloxy)silylstyrene, bis (heptamethyltrisiloxy) methylsilylstyrene, tris(methylbis (trimethylsiloxy)siloxy)silylstyrene, trimethylsiloxybis(tris (trimethylsiloxy)siloxy)silylstyrene, heptakis (trimethylsiloxy)trisiloxanylstyrene, nonamethyltetrasiloxyundecylmethylpentasiloxymethylsilylstyrene, tris(tris(trimethylsiloxy)siloxy)silylstyrene, tris (trimethylsiloxyhexamethyl)tetrasiloxy tris (trimethylsiloxysiloxy)trimethylsiloxysilylstyrene, nonakis (trimethylsiloxy)tetrasiloxanylstyrene, bis (tridecamethylhexasiloxy)methylsilylstyrene and the like.

Also, as typical examples of a silicon-containing styrene derivative other than the above silicon-containing styrene derivative represented by the general formula (II), there can be cited, for instance, heptamethylcyclotetrasiloxanylstyrene, heptamethylcyclotetrasiloxybis( trimethylsiloxy) silylstyrene, tripropyltetramethylcyclotetrasiloxanylstyrene and the like.

As the above silicon-containing fumarate, a compound having a fluoroalkyl group and a silicon-containing alkyl group in the same molecule is preferable in consideration of the improvement of oxygen permeability of an obtained water-absorptive soft contact lens.

As typical examples of the silicon-containing fumarate, there can be cited, for instance, trifluoroethyl (trimethylsilylmethyl) fumarate, trifluoroethyl (trimethylsilylpropyl) fumarate, hexafluoroisopropyl (trimethylsilylmethyl) fumarate, hexafluoroisopropyl (trimethylsilylpropyl) fumarate, octafluoropentyl (trimethylsilylmethyl) fumarate, octafluoropentyl (trimethylsilylpropyl) fumarate, trifluoroethyl (pentamethyldisiloxanylmethyl) fumarate, trifluoroethyl (pentamethyldisiloxanylpropyl) fumarate, hexafluoroisopropyl (pentamethyldisiloxanylmethyl) fumarate, hexafluoroisopropyl (pentamethyldisiloxanylpropyl) fumarate, octafluoropentyl (pentamethyldisiloxanylmethyl) fumarate, octafluoropentyl (pentamethyldisiloxanylpropyl) fumarate, trifluoroethyl (tetramethyl(trimethylsiloxy)disiloxanylmethyl) fumarate, trifluoroethyl (tetramethyl(trimethylsiloxy)disiloxanylpropyl) fumarate, hexafluoroisopropyl (tetramethyl(trimethylsiloxy)disiloxanylmethyl) fumarate, hexafluoroisopropyl (tetramethyl(trimethylsiloxy)disiloxanylpropyl) fumarate, octafluoropentyl (tetramethyl(trimethylsiloxy)disiloxanylmethyl) fumarate, octafluoropentyl (tetramethyl(trimethylsiloxy)disiloxanylpropyl) fumarate, trifluoroethyl (tris(trimethylsiloxy)silylmethyl) fumarate, trifluoroethyl (tris(trimethylsiloxy)silylpropyl) fumarate, hexafluoroisopropyl (tris(trimethylsiloxy)silylmethyl) fumarate, hexafluoroisopropyl (tris(trimethylsiloxy) silylpropyl) fumarate, octafluoropentyl (tris(trimethylsiloxy)silylmethyl) fumarate, octafluoropentyl (tris(trimethylsiloxy)silylpropyl) fumarate and the like.

These silicon-containing monomers can be used alone or in admixture thereof. Also, among these silicon-containing monomers, the silicon-containing (meth)acrylate represented by tris(trimethylsiloxy)silylpropyl (meth)acrylate and the silicon-containing styrene derivative represented by tris(trimethylsiloxy)silylstyrene are preferably used from the viewpoint that a water-absorptive soft contact lens having high mechanical strength can be easily obtained without lowering its oxygen permeability.

For instance, in order to adjust hardness of an obtained water-absorptive soft contact lens to a desired hardness and impart hardness or softness to the water-absorptive soft contact lens, and in order to more improve flexibility of an obtained water-absorptive soft contact lens, a reinforcing monomer can be used as a polymerizable monomer (C).

reinforcing

As typical examples of the above reinforcing monomer, there can be cited, for instance, straight, branched or cyclic alkyl (meth)acrylates such as (meth)acrylate, ethyl (meth)acrylate, isopropyl (meth)acrylate, n-propyl (meth)acrylate, isobutyl (meth)acrylate, n-butyl (meth)acrylate, t-butyl (meth)acrylate, n-pentyl (meth)acrylate, t-pentyl (meth) acrylate, hexyl (meth)acrylate, heptyl (meth)acrylate, 2-ethylhexyl (meth)acrylate, n-octyl (meth)acrylate, n-decyl (meth)acrylate, n-dodecyl (meth)acrylate, nonyl (meth)acrylate, stearyl (meth)acrylate, cyclopentyl (meth)acrylate and cyclohexyl (meth)acrylate; alkoxyalkyl (meth)acrylates such as 2-ethoxyethyl (meth)acrylate, 3-ethoxypropyl (meth)acrylate, 2-methoxyethyl (meth)acrylate and 3-methoxypropyl (meth)acrylate; alkylthioalkyl (meth) acrylates such as ethylthioethyl (meth)acrylate and methylthioethyl (meth)acrylate; styrene; α-methylstyrene; alkylstyrenes such as methylstyrene, ethylstyrene, propylstyrene, n-butylstyrene, t-butylstyrene, isobutylstyrene and pentylstyrene; alkyl-α-methylstyrenes such as methyl-α-methylstyrene, ethyl-α-methylstyrene, propyl-α-methylstyrene, n-butyl-α-methylstyrene, t-butyl-α-methylstyrene, isobutyl-α-methylstyrene and pentyl-α-methylstyrene; and the like. These can be used alone or in an admixture thereof.

For instance, in order to impart lipid stain resistance to an obtained water-absorptive soft contact lens, a fluoroalkyl (meth)acrylate, a fluoroalkylstyrene and the like can be used as a polymerizable monomer (C).

As typical examples of the above fluoroalkyl (meth)acrylate, there can be cited, for instance, 2,2,2-trifluoroethyl (meth)acrylate, 2,2,3,3-tetrafluoropropyl (meth)acrylate, 2,2,3,3,-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5, 5-hexafluoro-2,4-bis(trifluoromethyl)pentyl (meth)acrylate, 2,2,3,3,4,4-hexafluorobutyl (meth)acrylate, 2,2,2,2', 2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluorolpentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9, 9,10,10-hexadecafluorodecyl (meth)acrylate, 3,3,4,4,5,5,6, 6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8, 8,9,9,10,10,11,11,11-nonadecafluoroundecyl (meth) acrylate, 3,3,4,4,5,5,6,6,7,7,8,8,9,9,10,10,11,11,12,12-eicosafluorododecyl (meth)acrylate and the like.

As typical examples of the above fluoroalkylstyrene, there can be cited, for instance, p-trifluoromethylstyrene, p-heptafluoropropylstyrene, p-pentafluoroethylstyrene and the like.

The fluoroalkyl (meth)acrylate and the fluoroalkylstyrene can be used alone or in an admixture thereof.

The amount of the polymerizable monomer (C) varies depending upon its kinds and cannot be indiscriminately determined. However, it is desired that the amount of the polymerizable monomer (C) is adjusted to at most 50% by weight, preferably at most 45% by weight of the monomer mixture in order to avoid that the total amount of the fluorine-containing styrene derivative (A) and the N,N-dimethyl(meth)acrylamide (B) becomes relatively small, thereby the effects for improving oxygen permeability, mechanical strength and flexibility of an obtained water-absorptive soft contact lens are not sufficiently exhibited. Also, it is desired that the amount of the polymerizable monomer (C) is adjusted to at least 1% by weight, preferably at 5% by weight of the monomer mixture in order to avoid that the effects based on the use of the polymerizable monomer (C) are not sufficiently exhibited.

Furthermore, in the present invention, in order to more improve mechanical strength of an obtained water-absorptive soft contact lens and impart durability to the water-absorptive soft contact lens, it is desired that a crosslinkable monomer is properly contained in the monomer mixture.

As typical examples of the above crosslinkable monomer, there can be cited, for instance, ethyleneglycol di(meth)acrylate, diethyleneglycol di(meth)acrylate, triethyleneglycol di(meth)acrylate, propyleneglycol di(meth)acrylate, dipropyleneglycol di(meth)acrylate, diallyl fumarate, allyl (meth)acrylate, vinyl (meth)acrylate, trimethylolpropane tri (meth)acrylate, methacryloyloxyethyl (meth)acrylate, divinylbenzene, diallyl phthalate, diallyl adipate, triallyl diisocyanate, N-vinylmethylenepyrrolidone, 4-vinylbenzyl (meth)acrylate, 3-vinylbenzyl (meth)acrylate, 2,2-bis((meth)acryloyloxyphenyl)hexafluoropropane, 2,2-bis((meth)acryloyloxyphenyl)propane, 1,4-bis(2-(meth)

acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl) benzene, 1,4-bis(2-(meth) acryloyloxyisopropyl)benzene, 1,3-bis(2-(meth) acryloyloxyisopropyl)benzene, 1,2-bis(2-(meth) acryloyloxyisopropyl)benzene and the like. These can be used alone or in an admixture thereof. Among them, ethylene glycol di(meth)acrylate and vinylbenzyl (meth)acrylate are preferable from the viewpoint that the effects for improving mechanical strength of an obtained water-absorptive soft contact lens and imparting durability to the water-absorptive contact lens are large.

It is desired that the amount of the crosslinkable monomer is adjusted to at least 0.01 part by weight, preferably at least 0.05 part by weight based on 100 parts by weight of the total amount of the monomer mixture in order to sufficiently exhibit the effects for improving mechanical strength and imparting durability to an obtained water-absorptive soft contact lens. Also, it is desired that the amount of the crosslinkable monomer is adjusted to at most 5 parts by weight, preferably at most 1 part by weight based on 100 parts by weight of the total amount of the monomer mixture in order to avoid that an obtained water-absorptive soft contact lens becomes brittle.

In the present invention, in order to impart ultraviolet-ray absorptive properties to the water-absorptive soft contact lens, a polymerizable ultraviolet-ray absorbing agent, polymerizable ultraviolet-ray absorbing dyestuff and the like can be used as one of the monomer mixture.

As typical examples of the above polymerizable ultraviolet-ray absorbing agent, there can be cited, for instance, a polymerizable benzophenone ultraviolet-ray absorbing agent such as 2-hydroxy4-(meth) acryloyloxybenzophenone, a polymerizable benzotriazole ultraviolet-ray absorbing agent such as 2-(2'-hydroxy-5'-(meth)acryloyloxyethoxy3'-t-butyl-phenyl)-5-methyl-2H-benzotriazole, and the like. These can be used alone or in an admixture thereof.

Because there is a tendency that physical property such as mechanical strength of an obtained water-absorptive soft contact lens is lowered when the amount of the polymerizable ultraviolet-ray absorbing agent is too large, it is desired that the amount of the polymerizable ultraviolet-ray absorbing agent is adjusted to at most 3 parts by weight, preferably 0.1 to 2 parts by weight based on 100 parts by weight of the total amount of the monomer mixture.

As typical examples of the above polymerizable ultraviolet-ray absorbing dyestuff, there can be cited, for instance, polymerizable benzophenone ultraviolet-ray absorbing dyestuff such as 2,4-dihydroxy-3-(p-styrenoazo) benzophenone, 2,4-dihydroxy-5-(p-styrenoazo) benzophenone, 2,4-dihydroxy-3-(p-(meth) acryloyloxymethylphenylazo)benzophenone and 2,4-dihydroxy-5-(p-(meth)acryloyloxymethylphenylazo) benzophenone; polymerizable benzoic acid ultraviolet-ray absorbing dyestuff such as 2-hydroxy-4-(p-styrenoazo) phenyl benzoate; and the like. These can be used alone or in an admixture thereof.

Because there are tendencies that physical property such as mechanical strength of an obtained water-absorptive soft contact lens is lowered and that the color of the water-absorptive soft contact lens becomes too deep and transparency of the lens is lowered, thereby it becomes difficult for the water-absorptive soft contact lens to transmit visible-rays when the amount of the polymerizable ultraviolet-ray absorbing dyestuff is too large, it is desired that the amount of the polymerizable ultraviolet-ray absorbing dyestuff is adjusted to at most 3 parts by weight, preferably 0.1 to 2 parts by weight based on 100 parts by weight of the total amount of the monomer mixture.

In order to color an obtained water-absorptive soft contact lens, polymerizable dyestuff and the like can be used as one of the monomer mixture.

As typical examples of the above polymerizable dyestuff, there can be cited, for instance, polymerizable azo dyestuff such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth) acryloyloxynaphthalene and 1-(((4'-phenylazo)phenyl)azo)-2-hydroxy-3-(meth)acryloyloxynaphthalene; polymerizable anthraquinone dyestuff such as 1,5-bis((meth) acryloylamino)-9,10-anthraquinone, 1-(4'-vinylbenzoylamido)-9,10-anthraquinone and 4-amino-1-(4'-vinylbenzoylamido)-9,10-anthraquinone; polymerizable nitro dyestuff such as o-nitroanilinomethyl (meth)acrylate; polymerizable phthalocyanine dyestuff such as (meth) acryloyl-modified tetraamino copper phthalocyanine, and (meth)acryloyl-modified (dodecanoyl-modified tetraamino copper phthalocyanine); and the like. These can be used alone or in an admixture thereof.

Because there are tendencies that physical property such as mechanical strength of an obtained water-absorptive soft contact lens is lowered and that the color of the water-absorptive soft contact lens becomes too deep and transparency of the lens is lowered, thereby it becomes difficult for the water-absorptive soft contact lens to transmit visible-rays when the amount of the polymerizable dyestuff is too large, it is desired that the amount of the polymerizable dyestuff is adjusted to at most 1 part by weight, preferably 0.001 to 0.5 part by weight based on 100 parts by weight of the total amount of the monomer mixture.

The amount of each component of the monomer mixture comprising the fluorine-containing styrene derivative (A), the N,N-dimethyl(meth)acrylamide (B) and the like is properly adjusted to a desired amount, and the monomer mixture is subjected to the polymerization.

In the the present invention, a polymer can be obtained by adjusting the amount of each component of the monomer mixture comprising the fluorine-containing styrene derivative (A), the N,N-dimethyl(meth)acrylamide (B) and, as occasion demands, the polymerizable monomer (C), the crosslinkable monomer and the like to a desired amount within the above range of the amount, respectively, adding, for instance, a radical polymerization initiator to the monomer mixture, and polymerizing the monomer mixture according to a usual method.

The above usual method is, for instance, a method comprising adding the radical polymerization initiator to the monomer mixture and carrying out the polymerization by gradually heating the monomer mixture within the range of the temperature of room temperature to about 130° C. (thermal polymerization) or by irradiating electromagnetic wave such as microwave, ultraviolet-ray or radial rays (gamma rays) to the monomer mixture. When the thermal polymerization is carried out, the temperature of the monomer mixture may be increased stepwise. The polymerization may be carried out according to a bulk polymerization method, a solution polymerization method using a solvent and the like, or the other methods.

As typical examples of the radical polymerization initiator, there can be cited, for instance, azobisisobutyronitrile, azobisdimethylvaleronitrile, benzoyl peroxide, t-butyl hydroperoxide, cumene hydroperoxide and the like. These can be used alone or in an admixture thereof. When the polymerization is carried out utilizing a ray and the like, it is desired that a photo polymerization initiator and a sensitizer are added to the monomer mixture. It is desired that the total mount of the above polymerization initiator and the sensitizer is 0.002 to 2 parts by weight, preferably 0.01 to 1 part by weight based on 100 parts by weight of the total amount of the monomer mixture.

In the present invention, as a method for forming the polymer into a soft contact lens, a forming method which has been usually employed by a person skilled in the art can be employed. As the forming method, for instance, there are a cutting process, a molding method and the like. The cutting process is a method comprising carrying out the polymerization in a suitable mold or a suitable container to give a material (polymer) having a shape such as bar, block or plate and subjecting the polymer to a mechanical process such as a cutting process or a polishing process to give a formed article having a desired shape. The molding method is a method comprising polymerizing the above monomer mixture in a mold having a shape corresponding to a desired shape of a contact lens to give a molded product and, as occasion demands, subjecting the molded product to a mechanically finishing process to give a formed article.

In addition to these methods, in the present invention, there can be employed, for instance, a method described in Japanese Unexamined Patent Publication No. 278024I/1987 and No. 11854/1989, which comprises impregnating a lens material (polymer) with a monomer which gives a hard polymer, after that polymerizing the monomer to more harden the lens material in whole, subjecting the lens material to a cutting process to give a formed product having a desired shape and removing the hard polymer from the formed product to give a formed article made of the lens material, and the like.

The formed article produced in accordance with the above procedure is then hydrated by immersing the formed article in distilled water, saline, an aqueous solution whose osmotic pressure and pH are properly adjusted, or the like, so that a water-absorptive soft contact lens can be obtained.

The water-absorptive soft contact lens of the present invention has excellent oxygen permeability, high mechanical strength and excellent flexibility independent of water content. The water content, mechanical strength and flexibility of the water-absorptive soft contact lens can be arbitrarily adjusted to desired values by adjusting the mixing ratio of the components of the monomer mixture to suitable values. Accordingly, various contact lenses can be obtained in compliance with their purposes.

The water-absorptive soft contact lens of the present invention is more specifically described and explained by means of the following Examples. It is to be understood that the present invention is not limited to the Examples, and various changes and modifications may be made in the invention without departing from the spirit and scope thereof.

EXAMPLE 1

As a monomer mixture, a mixture of 40 parts by weight of 4-vinylbenzyl 3',3',4',4',5',5',6',6',6'-nonafluorohexyl ether, 60 parts by weight of N, N-dimethylacrylamide and 0.3 part by weight of ethyleneglycol dimethacrylate was used. As a polymerization initiator, 2,2'-azobis(2,4-dimethylvaleronitrile) was added to the monomer mixture in an amount of 0.1 part by weight based on 100 parts by weight of the total amount of the monomer mixture and dissolved in the monomer mixture. Then, the obtained mixture was poured into a test tube made of glass having an inside diameter of 14 mm.

After the test tube was put into a thermostated circulating water bath and heated at 30° C. for 24 hours, the 40° C. for 16 hours and at 50° C. for 8 hours, the test tube was transferred from the thermostated circulating water bath to a circulating dry oven. Successively, polymerization was carried out by maintaining the temperature of the mixture in the test tube at 50° C. for 5 hours in the circulating dry oven, increasing the temperature at a rate of 10° C. per 1.5 hours to 120° C. and maintaining the temperature for 3 hours. After that, the test tube was gradually cooled to a room temperature to give a polymer having a shape like a bar.

To the obtained polymer, a cutting and polishing process was conducted to give a test piece having a desired thickness and a diameter of about 12 mm. Each of physical properties of the test piece was examined in accordance with the following method. The results are shown in Table 1.

(A) Needle penetration strengh
  (i) Needle penetration weight
    Using a needle penetration tester, a pressure needle having a diameter of $\frac{1}{16}$ inch was put on the center of the test piece and needle penetration weight (g) at breaking of the test piece was measured. The value listed on Table 1 means a value when the thickness of the test piece is converted into 0.2 mm.
  (ii) Elongation ratio
    When the above item (i) Needle penetration weight was measured, elongation ratio (%) at breaking of the test piece was measured.

(B) Hardness
  After the test piece having a thickness of 4 mm, whose both surfaces are flat was hydrated by immersing in distilled water for 2 weeks, hardness of the test piece was measured at 25° C. with a spring-type hardness tester (Type A) described in "Physical Testing Methods for Vulcanized Rubber" prescribed JIS (Japanese Industrial Standard) K 6301.

(C) Water content
  Water content (% by weight) of the test piece having a thickness of 1 mm at 35° C. was determined by the following equation.

Water content (% by weight)=$\{(W-W_o)/W\} \times 100$ wherein W is a weight (g) of the test piece in the hydrated state after the hydration treatment, and $W_o$ is a weight (g) of the test piece in the dried state after dried in a desiccator.

(D) Oxygen permeability
  (i) Actually surveyed value
    Using a Seikaken-type film oxygen-gas permeater commercially available from RIKASEIKI KOGYO CO., LTD., oxygen permeability of the test piece having a thickness of 0.2 mm was measured in saline at 35° C. The unit of the oxygen permeability is $(cm^2/sec) \cdot (ml\ O_2/(ml \cdot mmHg))$, and the oxygen permeability listed on Table 1 means a value when the original value of the oxygen permeability is multiplied by $10^{11}$.
  (ii) Calculated value
    Oxygen permeability (Dk) of the test piece was calculated on the basis of the following equation described in Journal of Fatt et al.

Dk=$2.0E-11\exp(0.0411 \times \text{Water content (\% by weight)})$

Examples 2 to 16 and Comparative Examples 1 to 2

Polymers were obtained in the same manner as in Example 1 except that the components of the monomer mixture were changed to those shown in Table 1, and test pieces were produced from the obtained polymers in the same manner as in Example 1.

The physical properties of the obtained test pieces were examined in the same manner as in Example 1. The results are shown in Table 1.

Each code listed on Table 1 is intended to mean the following monomer.

FSt: 4-vinylbenzyl 3',3',4',4',5',5',6',6',6'- nonafluorohexyl ether

DMAA N,N-dimethylacrylamide
MMA: methyl methacrylate
6FP: 2,2,2,2',2',2'-hexafluoroisopropyl methacrylate
Si4MA: tris(trimethylsiloxy)silylpropyl methacrylate
SiSt: tris(trimethylsiloxy)silylstyrene
N-VP: N-vinyl-2-pyrrolidone
EDMA: ethyleneglycol dimethacrylate
VBMA: vinylbenzyl methacrylate

TABLE 1

| | Component of monomer mixture (parts by weight) | | | | | | | | |
|---|---|---|---|---|---|---|---|---|---|
| Ex. | (A) | (B) | (C) | | | | | Crosslinkable monomer | |
| No. | FSt | DMAA | MMA | 6FP | Si4MA | SiSt | N-VP | EDMA | VBMA |
| 1 | 40 | 60 | - | - | - | - | - | 0.3 | - |
| 2 | 50 | 50 | - | - | - | - | - | 0.3 | - |
| 3 | 60 | 40 | - | - | - | - | - | 0.3 | - |
| 4 | 60 | 40 | - | - | - | - | - | - | 0.3 |
| 5 | 60 | 40 | - | - | - | - | - | - | 0.5 |
| 6 | 70 | 30 | - | - | - | - | - | 0.3 | - |
| 7 | 50 | 40 | 10 | - | - | - | - | 0.3 | - |
| 8 | 50 | 40 | - | 10 | - | - | - | 0.3 | - |
| 9 | 50 | 40 | - | - | 10 | - | - | 0.3 | - |
| 10 | 40 | 40 | 20 | - | - | - | - | 0.3 | - |
| 11 | 40 | 40 | - | - | 20 | - | - | 0.3 | - |
| 12 | 30 | 50 | - | - | 20 | - | - | - | 0.3 |
| 13 | 20 | 50 | - | - | 30 | - | - | - | 0.3 |
| 14 | 10 | 50 | - | - | 40 | - | - | - | 0.3 |
| 15 | 30 | 50 | - | - | - | 20 | - | - | 0.3 |
| 16 | 20 | 60 | - | - | - | 20 | - | - | 0.3 |
| Com. Ex. | | | | | | | | | |
| 1 | - | - | 35 | - | - | - | 65 | 0.2 | - |
| 2 | - | 45 | 55 | - | - | - | - | 1 | - |

| | Physical properties of test piece (polymer) | | | | | |
|---|---|---|---|---|---|---|
| | Needle penetration strength | | | | Oxygen permeability | |
| Ex. No. | Needle penetration weight (g) | Elongation ratio (%) | Hardness (−) | Water content (% by weight) | Actually surveyed value | Calculated value |
| 1 | 30 | 111 | 5 | 69 | 42 | 34 |
| 2 | 53 | 133 | 12 | 62 | 40 | 26 |
| 3 | 118 | 140 | 22 | 45 | 42 | 13 |
| 4 | 136 | 130 | 25 | 40 | 42 | 10 |
| 5 | 159 | 101 | 32 | 44 | 39 | 12 |
| 6 | 500 | 135 | 61 | 28 | 45 | 6 |
| 7 | 162 | 100 | 30 | 48 | 34 | 14 |
| 8 | 190 | 75 | 44 | 47 | 35 | 14 |
| 9 | 100 | 125 | 21 | 49 | 44 | 15 |
| 10 | 246 | 93 | 46 | 49 | 26 | 15 |
| 11 | 103 | 133 | 22 | 50 | 51 | 16 |
| 12 | 152 | 147 | 17 | 58 | 55 | 22 |
| 13 | 204 | 188 | 21 | 56 | 55 | 20 |
| 14 | 218 | 185 | 26 | 53 | 55 | 18 |
| 15 | 269 | 165 | 27 | 56 | 49 | 20 |
| 16 | 188 | 163 | 16 | 66 | 46 | 30 |
| Com. Ex. | | | | | | |
| 1 | 246 | 59 | 19 | 61 | 22 | 25 |
| 2 | 180 | 309 | — | 44 | 17 | 12 |

From the results shown in Table 1, it can be seen that every actually surveyed value of oxygen permeability of each of polymers obtained in Examples 1 to 16, which have various water content are greatly higher than the calculated value based on the water content, respectively. That is, it can be seen that every polymer obtained in Examples 1 to 16 has excellent oxygen permeability independent of water content.

To the contrary, it can be seen that the actually surveyed value of oxygen permeability of the polymer obtained in Comparative Example 1 is lower than the calculated value based on the water content, and that the actually surveyed value of oxygen permeability of the polymer obtained in Comparative Example 2 is almost the same as the calculated value based on the water content. That is, it can be seen that the oxygen permeability of the polymers obtained in Comparative Examples 1 to 2 depends on water content.

Furthermore, it can be seen that the polymers obtained in Examples 1 to 16 have the hardness of lower than 70 and excellent flexibility in addition to high mechanical strength, and that the water content, mechanical strength and flexibility of the polymers can be arbitrarily adjusted to desired values by adjusting the mixing ratio of the components of the monomer mixture to suitable values.

In addition to the ingredients used in the Examples, other ingredients can be used in the Examples as set forth in the specification to obtain substantially the same results.

What is claimed is:

1. A water-absorptive soft contact lens comprising a polymer prepared by polymerizing a monomer mixture consisting of:

(A) a fluorine-containing styrene derivative of the formula (I):

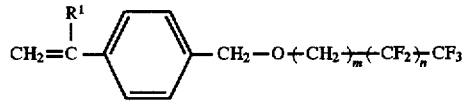

wherein $R^1$ is hydrogen atom or methyl group, m is an integer of 1 to 3 and n is 0 or an integer of 1 to 7, (B) N,N-dimethyl(meth)acrylamide, and (C) 1 to 50% by weight of other monomer copolymerizable with said fluorine-containing styrene derivative (I) and N,N-dimethyl(meth)acrylamide, with or without a crosslinking monomer, wherein the ratio of the component (A) to the component (B) is from 10/90 to 80/20 by weight, and said other monomer (C) is a silicon-containing monomer and optionally at least one member selected from the group consisting of hydroxyethyl (meth)acrylate, hydroxypropyl (meth) acrylate, hydroxybutyl (meth)acrylate, dihydroxybutyl (meth)acrylate, diethyleneglycol mono(meth)acrylate, triethyleneglycol mono(meth)acrylate, propyleneglycol mono(meth)acrylate, dipropyleneglycol mono (meth)acrylate, (meth)acrylic acid, an aminoalkyl (meth)acrylate, an alkoxy group-containing (meth) acrylate, maleic arthydride, maleic acid, a maleic acid derivative, fumaric acid, a fumaric acid derivative, aminostyrene, hydroxystyrene, an alkyl (meth)acrylate, an alkoxyalkyl (meth)acrylate, an alkylthioalkyl (meth) acrylate, styrene, α-methylstyrene, an alkylstyrene, an alkyl-α-methylstyrene, a fluoroalkyl (meth)acrylate, and a fluoroalkylstyrene.

2. The water-absorptive soft contact lens of claim 1, wherein said silicon-containing monomer is at least one member selected from the group consisting of a silicon-containing (meth)acrylate, a silicon-containing fumarate, a silicon-containing styrene derivative of the formula II:

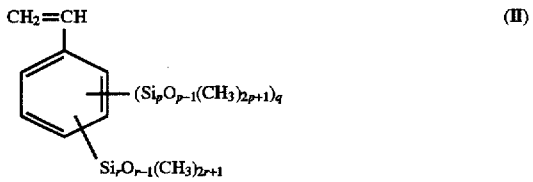

wherein p is an integer of 1 to 15, q is 0 or 1, and r is an integer of 1 to 15, heptamethylcyclotetrasiloxanylstyrene, heptamethylcyclotetrasiloxanylbis(trimethylsiloxy) silylstyrene, and tripropyltetmmethylcyelotetrasiloxanylstyrene.

3. The water-absorptive soft contact lens of claims 1, wherein said monomer mixture is used with 0.01 to 5 parts by weight of said crosslinking monomer per 100 parts by weight of said monomer mixture.

4. A water absorptive soft contact lens comprising a polymer prepared by polymerizing a monomer mixture consisting of:

(A) a fluorine-containing styrene derivative of the formula (I):

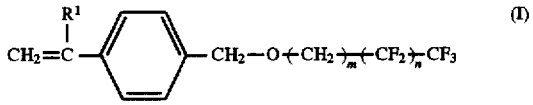

wherein $R^1$ is a hydrogen atom or methyl group, m is an integer of 1 to 3 and n is 0 or an integer of 1 to 7, and (B) N,N-dimethyl(meth)acrylamide.

5. The water-absorptive soft contact lens of claim 1, wherein said monomer mixture consists of the components (A) and (B) and the component (C) which is a member selected from the group consisting of a silicon-containing (meth)acrylate and a silicon-containing styrene.

* * * * *